United States Patent [19]

Tanabe

[11] Patent Number: 5,494,000
[45] Date of Patent: Feb. 27, 1996

[54] POULTRY WATER FEEDER

[75] Inventor: Atsushi Tanabe, Shizuoka, Japan

[73] Assignee: Azuma Corporation, Mishima, Japan

[21] Appl. No.: 189,699

[22] Filed: Feb. 1, 1994

[30] Foreign Application Priority Data

Feb. 1, 1993 [JP] Japan .................... 5-033944

[51] Int. Cl.⁶ ............................................. A01K 39/02
[52] U.S. Cl. ............................................. 119/72.5
[58] Field of Search ................... 119/72, 72.5, 75, 119/51.01; 248/74.2, 62, 58

[56] References Cited

U.S. PATENT DOCUMENTS

| | | |
|---|---|---|
| 2,614,531 | 10/1952 | Futterer et al. . |
| 3,263,652 | 8/1966 | Nakajima et al. . |
| 3,669,077 | 6/1972 | Spierenburg . |
| 3,716,030 | 2/1973 | Godshalk et al. . |
| 4,516,533 | 5/1985 | Mallinson ........................ 119/72 |
| 4,524,724 | 6/1985 | Steudler, Jr. . |
| 5,154,138 | 10/1992 | Siddiqui et al. . |
| 5,245,950 | 9/1993 | Johnson ........................ 119/72 |
| 5,293,836 | 3/1994 | Hostetler ........................ 119/72 |

FOREIGN PATENT DOCUMENTS

| | | |
|---|---|---|
| 0554884 | 8/1993 | European Pat. Off. . |
| 4203451 | 8/1993 | Germany . |
| 59-29179 | 2/1984 | Japan . |
| 3-9150 | 1/1991 | Japan . |
| 1248622 | 10/1971 | United Kingdom . |

*Primary Examiner*—Thomas Price
*Attorney, Agent, or Firm*—Oblon, Spivak, McClelland, Maier, & Neustadt

[57] ABSTRACT

A poultry water feeder includes a water feeder main body, a plug attached to the lower end of the main body and defining a water passage, a water feeder pin fitted in the water passage defined by the plug to be vertically movable tiltable therein, the water feeder pin being tapered downward, and a valve which normally closes the upper end of the water passage and opens the water passage when the water feeder pin is raised.

6 Claims, 4 Drawing Sheets

POULTRY WATER FEEDER

BACKGROUND OF THE INVENTION

1. Field of the Invention

This invention relates to a water feeder for use mainly in the poultry industry.

2. Description of the Prior Art

The water feeder systems used in poultry houses consist of a water supply pipe fitted with water feeders each having a feeder pin at its lower end. When a chicken lifts the tip of the feeder pin with its beak it is automatically supplied with water.

Water feeders of this type are taught, for example, by Japanese Utility Model Public Disclosures Sho 59 (1984)—29179 and Hei 3 (1991)—9150 and U.S. Pat. Nos. 3,669,077 and 4,524,724.

The water feeder according to U.S. Pat. No. 4,524,724 is shown by way of example in FIG. 7 of the attached drawings. The water feeder comprises a cylindrical housing 30 attached to a water supply pipe (not shown) and a plug 32 with an internal vertically movable feeder pin 31 is fitted into the lower opening of the housing 30. Inside the housing 30, a spherical valve 33 is pressed onto the top of the plug 32 by a small amount of water pressure and its own weight, thus sealing the upper opening of the plug 32 and closing off the supply of water.

When a chicken raises the feeder pin 31 with its beak, the spherical valve 33 is raised to form a gap between the valve 33 and the edge of the upper opening of the plug 32. As a result, the low pressure water in the water supply pipe passes through the housing 30 and the plug 32 so that a drop of water forms on and falls from the pin 31.

Although chicks require only a small amount of water at first, the amount they need increases gradually as they get larger. If the amount of water supply should become insufficient, the growth of a chick can be markedly stunted.

With the prior art water feeders, since the practice has been to adjust the amount of water supplied to that appropriate for the chicks, such amount of water is insufficient for the fowl to prevent the fowl from fully growing. When the amount of water is adjusted for the fowl, however, there is a possibility of the chicks scattering excess water around the poultry house and, as a result, the floor of the poultry house gets wet. This promotes the propagation of bacteria and mold and thus increases the risk of the fowl contracting diseases. The amount of water supplied can be adjusted to some extent by regulating the water pressure, but this water supply adjustment has its own limitation.

The problem with this is that the water spilled on the floor and remaining on the feeder pin 31 is scattered around the poultry house by the birds as they move about. Since this wetting of the interior of the poultry house promotes the propagation of bacteria and mold, it increases the risk of the fowl contracting diseases.

In addition, the feeder pin 31 of the prior art water feeder makes line or surface contact with the passage wall 32a of the plug 32 and tends to stick to the passage wall 32a owing to the viscosity produced by chemicals added to the water. When this happens, the water feeder stops acting as a valve for the supplied water and allows water to flow uncontrolled, leading to further wetting of the poultry house floor. In addition, the feeder pin 31 sticks to the passage wall 32a owing to the surface tension of the adhering water, making it difficult to push the feeder pin 31 upward.

SUMMARY OF THE INVENTION

This invention was accomplished to overcome these technical problems of the prior art and has as one object to provide a poultry water feeder which enables the amount of water supplied to be regulated according to the size of the chickens being raised and which, by preventing the dripping of a remaining water drop from the water feeder pin, enables the poultry house to be maintained in a sanitary condition.

Another object of the invention is to provide a poultry water feeder which ensures reliable operation of the water feeder pin at all times.

The invention achieves the foregoing objects by providing a poultry water feeder comprising a water feeder main body, a plug attached to the lower end of the main body and defining a water passage, a water feeder pin fitted in the water passage defined by the plug to be vertically movable therein, the water feeder pin being tapered downward, and a valve which normally closes the upper end of the water passage and opens it when the water feeder pin is raised. According to another aspect of the invention, a portion of the water feeder pin extending to the exterior of the plug is provided with a collar portion, a recessed portion or some other such means for preventing formation of a hanging drop of remaining water.

Not being strong enough to push the water feeder pin upward, chicks peck at it from the side when drinking. The resulting lateral movement of the water feeder pin feeds only a small amount of water, as is appropriate for chicks. If a chick does not drink all of the water supplied, the remainder is prevented from dripping to the floor by the means for preventing formation of a hanging drop of remaining water.

As chicks grow larger, they begin pushing the water feeder pin upward when they drink. The larger the bird, the more upward force it exerts on the water feeder pin and the more water it receives. Each chicken is thus supplied with an amount of water appropriate for its size.

Owing to these features, the water feeder according to the invention is able to feed chickens ranging in size from chicks to adult birds with the amount of water that each requires, and without making the interior of the poultry house damp. As a result, it contributes to a faster weight gain rate for the chickens.

Moreover, in accordance with another aspect of the invention, the wall of the water passage is formed with an annular projection which supports the water feeder pin by point contact and thus ensures that the viscosity of any chemicals that the water feeder pin comes in contact with will not cause it to stick to the wall of the water passage.

The above and other features of the present invention will become apparent from the following description made with reference to the drawings.

DESCRIPTION OF THE PREFERRED EMBODIMENTS

Figure 1:
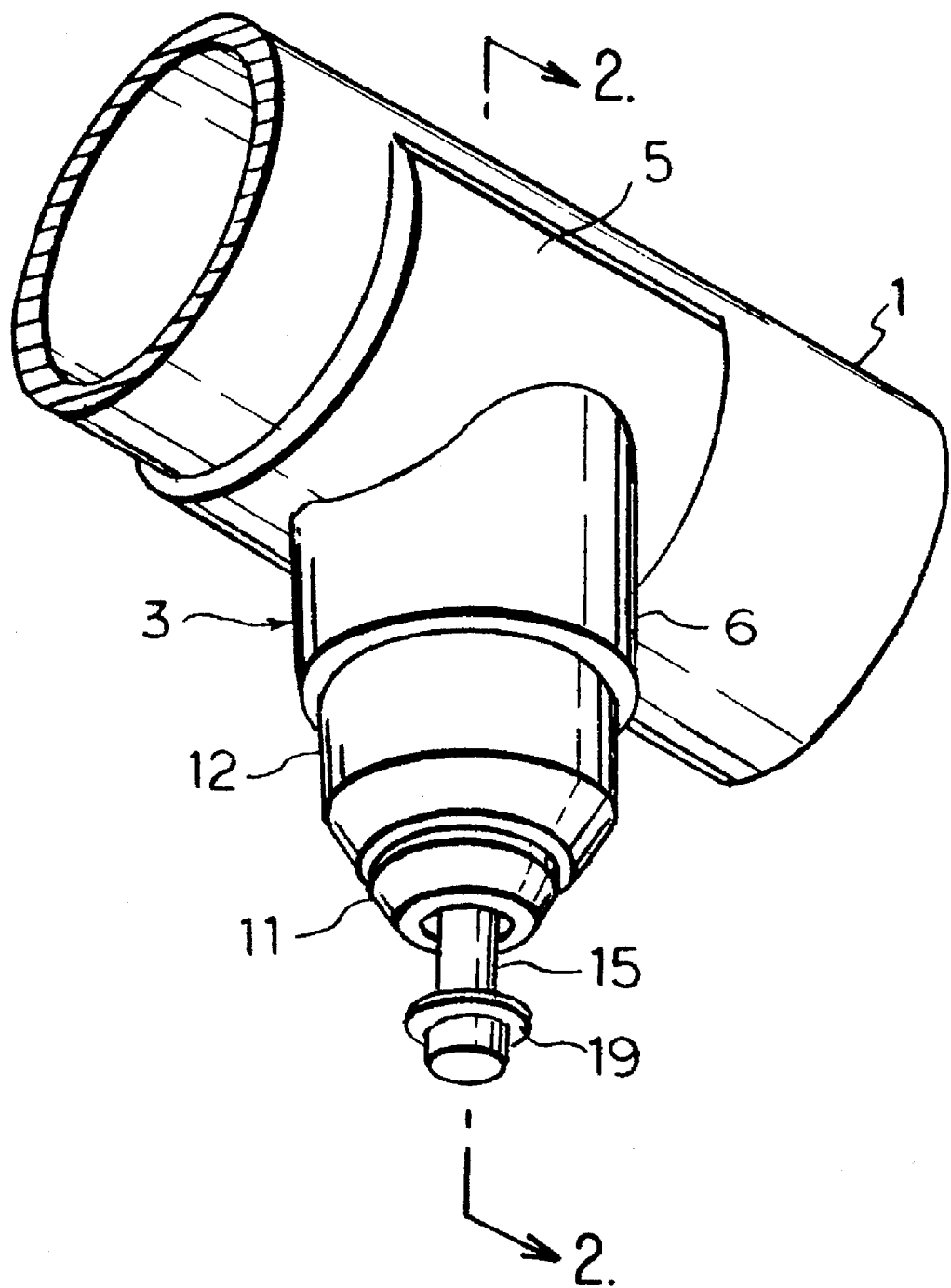
FIG. 1 is a perspective view showing an embodiment of the poultry water feeder according to the invention.
Figure 2:
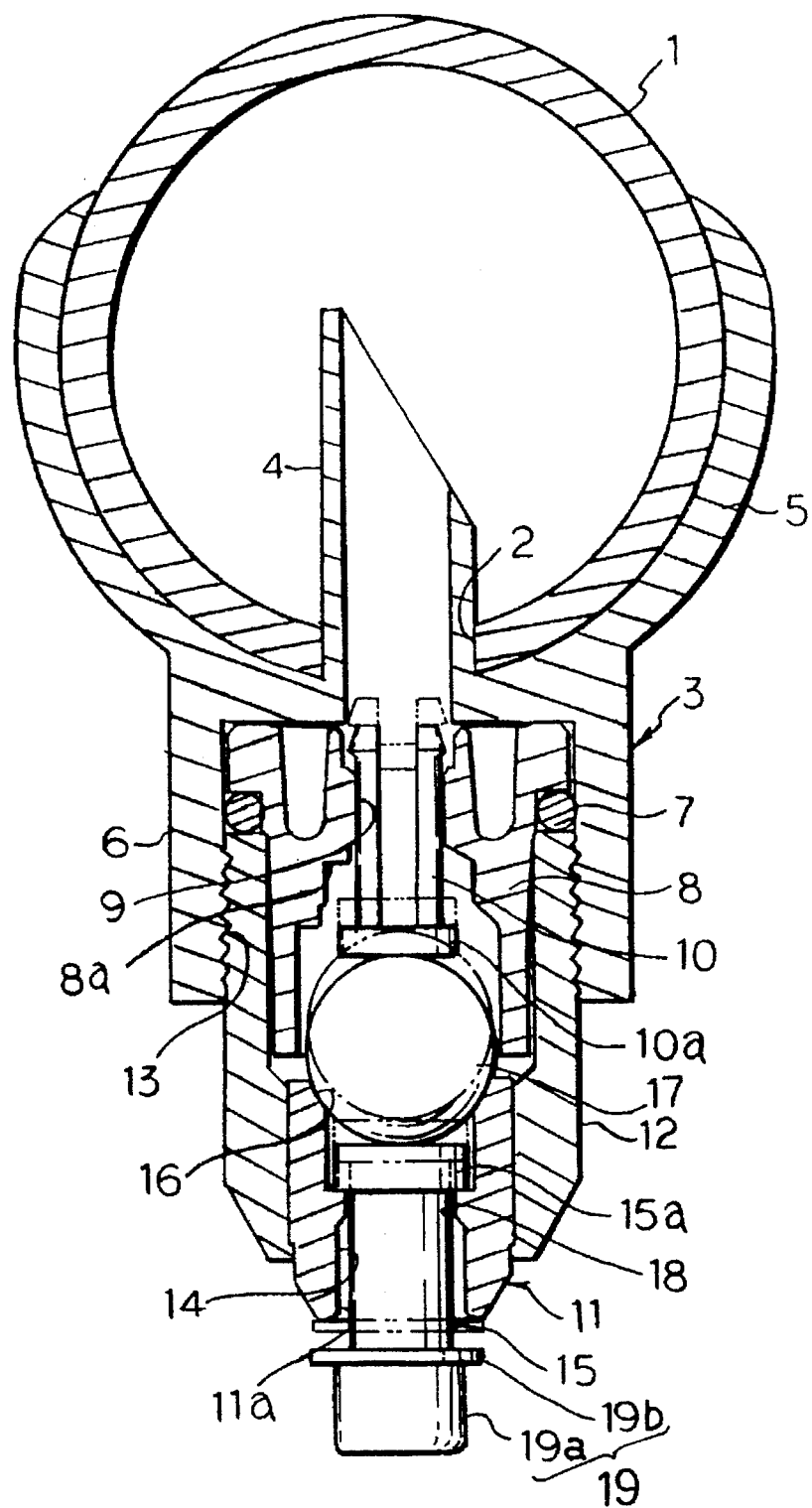
FIG. 2 is a vertical sectional view taken along line II—II in FIG. 1.

FIGS. 1 and 2 show an embodiment of the poultry water feeder according to the present invention for use in a poultry house. A number of the water feeders are attached at appropriate locations to a water supply pipe 1 which extends, for example, in the longitudinal direction of a poultry house. The underside of the water supply pipe 1 is formed with an opening 2 at each location where a water feeder is to be fitted. A water inlet pipe 4 projecting from the inner surface of an adapter 3 is fitted snugly into the opening 2 and a holder portion 5 of the adapter 3 is snapped onto the outer surface of the water supply pipe 1 from below. A cylindrical insert 8 is fitted into a downward projecting cylindrical connector portion 6 of the adapter 3 and maintained in an air tight state therein by an O-ring 7. The center of the insert 8 is formed with a vertical water passage 9 and a feed amount adjustment pin 10 for adjusting the amount of water fed is fitted into the water passage 9 to be movable vertically therein.

A cylindrical housing 12 fitted internally with a plug 11 and having an external thread at its upper end is screwed into engagement with an internal thread 13 of the connector portion 6 of the adapter 3 so as to enclose the insert 8. The adapter 3 and the housing 12 together constitute the main body of the water feeder. (The coupling between the adapter 3 and the housing 12 need not necessarily be by means of threads but can instead be by the well-known hook method, for example.)

A water feeder pin 15 formed with a head 15a for preventing extraction is fitted into a vertical water passage 14 passing through the center of the plug 11 so as to be movable vertical therein. A ball valve 17 made of stainless steel or the like is seated on an upper opening 16 of the plug 11 so as to seal the upper opening 16 by its own weight and the small amount of water pressure acting thereon. A flange 10a formed at the bottom of the feed amount adjustment pin 10 rests on the top of the ball valve 17, whereby vertical movement of the ball valve 17 is transmitted to the feed amount adjustment pin 10.

Figure 5:
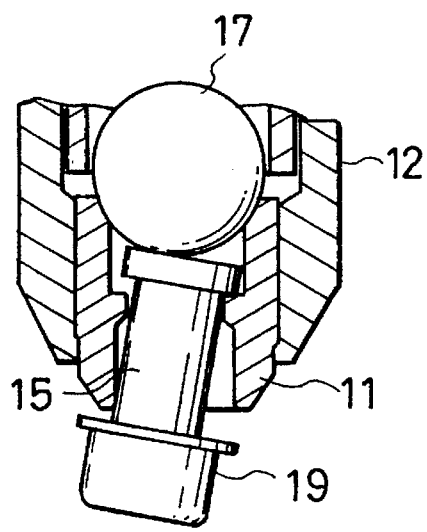
FIG. 5 is an explanatory view showing the water feeder pin of the water feeder of FIG. 1 tilted to one side.

The downstream water passage 14, which serves as a passage for water during water feeding and also as a guide for vertical movement of the water feeder pin 15, is formed on its inner wall with an annular projection 18 which encloses the periphery of the water feeder pin 15 and seats its head 15a. The seating of the head 15a of the water feeder pin 15 on the annular projection 18 in this manner ensures that even when the water feeder pin 15 is tilted to one side as shown in FIG. 5 the water feeder pin 15 is supported to be vertically movable by point contact with the annular projection 18 and the edge 11a of the bottom opening of the plug 11. As a result, even if the feed water should be viscous owing to chemical agents added thereto, the vertical movement of the water feeder pin 15 will not be hindered since the viscosity will not cause the water feeder pin 15 to stick to the wall of the water passage 14.

Figure 3:
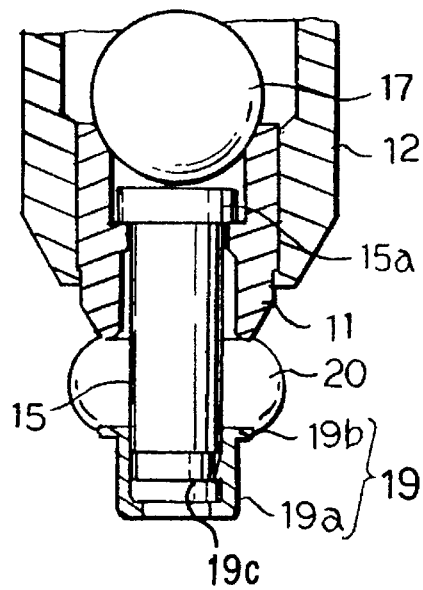
FIG. 3 is an explanatory view showing a water drop hanging from the water feeder pin of the water feeder of FIG. 1.

The water feeder according to this invention is also provided with means for preventing a drop of remaining water from hanging down from the tip of the water feeder pin 15. By way of example, the means used for this purpose in the illustrated embodiment is shown to be a collar member 19 attached near the lower end of the water feeder pin 15. As shown in FIG. 3, the feeder pin 15 has a lower recess while the collar 19 has an inwardly projecting flange 19c formed on the inner surface of the cap 19a thereof so that the flange 19c and the lower recessed portion complimentarily engage each other, whereby the collar 19 is not detached from the feeder pin 15 even when a chicken forcefully pulls the collar 19 with its beak. The collar member 19 is formed of synthetic resin or the like consists of a cap 19a that is forced over the lower end of the pin and an annular flange 19b that projects laterally from the upper edge of the cap 19a. Thus when the cap 19a is fitted onto the end of the water feeder pin 15, the flange 19b comes to be positioned slightly above the lower end of the pin. As a result, the water drop 20 that remains after a bird has finished drinking is blocked from flowing downward by the flange 19b, as shown in FIG. 3. Thus no water drop 20 remains hanging from the tip of the water feeder pin 15.

Figure 4:
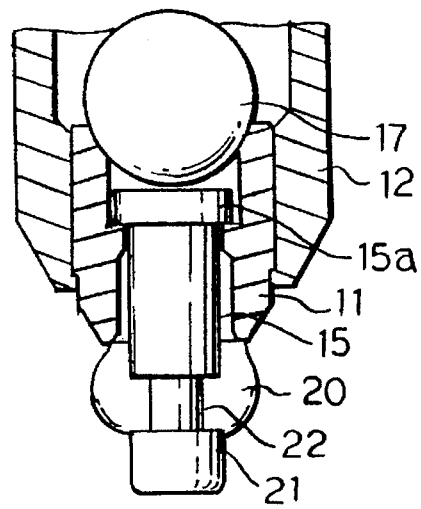
FIG. 4 is a front view of another configuration of the water feeder pin of the water feeder of FIG. 1.

Another example of the means for preventing formation of a hanging drop of remaining water is shown in FIG. 4. In this case, a collar 21 is formed integrally with the water feeder pin 15 at a position slightly above its tip and the portion of the water feeder pin 15 immediately above the collar 21 is formed with a recess 22 where water can accumulate. This arrangement is able to prevent formation of a hanging drop for even larger amounts of remaining water. The feed amount adjustment pin 10 in the water passage 9 and the water feeder pin 15 in the water passage 14 are both tapered downwardly. Owing to this configuration, the size of the gap between each of the pins 10, 15 and the wall of the associated water passage 9 or 14 increases in proportionally as these pins are pushed upward. The taper may be continuous, stepwise or curved.

The operation of the water feeder will now be briefly explained. When a chicken lifts the water supply pipe 1 with its beak, the ball valve 17 closing the upper opening 16 of the plug 11 moves upward to form a gap for passage of water. As a result, the low-pressure water in the water supply pipe 1 flows from the water inlet pipe 4 through the gap around the feed amount adjustment pin 10 and then from the opening 16 at the top of the plug 11 along the water feeder pin 15 to drip into the mouth of the chicken.

Figure 6:
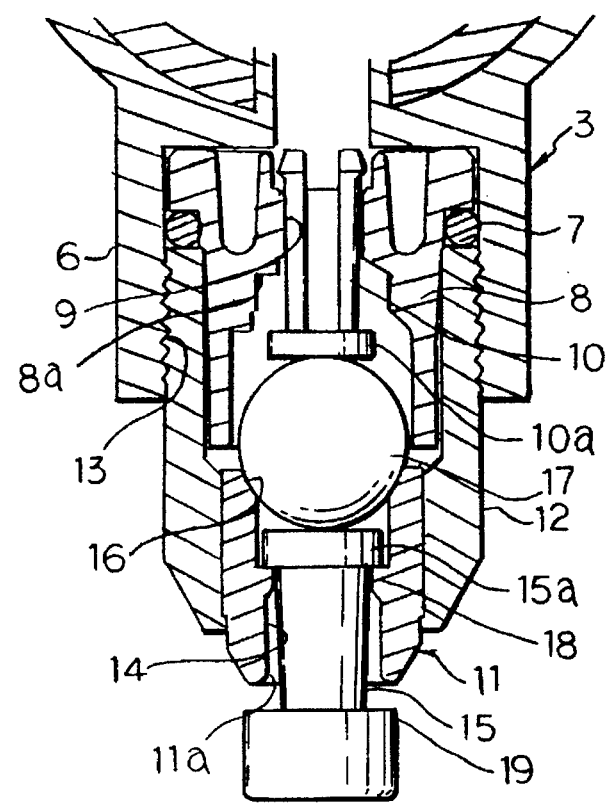
FIG. 6 is a sectional view showing other configurations of the feed amount adjustment pin and the water feeder pin of the water feeder of FIG. 1.
Figure 7:
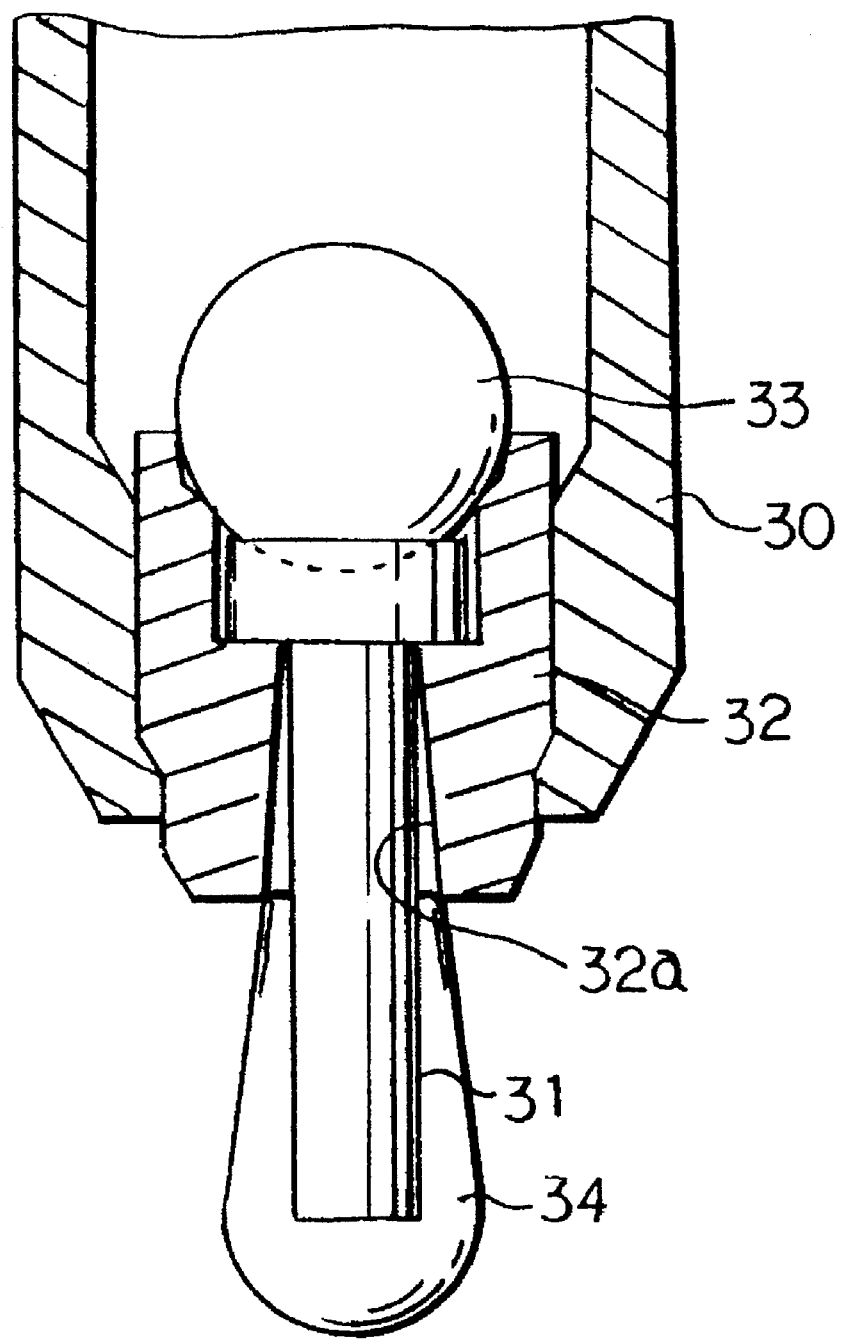
FIG. 7 is a vertical sectional view of the essential part of the prior art poultry water feeder.

The farther the feed amount adjustment pin 10 and the water feeder pin 15 are pushed up, the larger becomes the area of the water passage around the ball valve 17 and, consequently, the more rapid becomes the rate of water supply. This is the desirable situation in the case of large fowl. Chicks, on the other hand, drink more by pushing the water feeder pin 15 sidewise than by pushing it upward. (See FIGS. 5,6.) Since sidewise motion of the water feeder pin 15 produces only a small gap around the ball valve 17, only a small amount of water is supplied, as is desirable in the case of chicks. No matter what the size of the bird, any undrunk water is prevented from dripping to the floor by the means for preventing formation of a hanging drop of remaining water. The adjustment pin 10 is shown in FIG. 6 as being downwardly tapered. As also shown in FIG. 3, the water feeder pin 15 has a lower recessed portion and the collar 19 includes an inwardly projecting flange which engages with the lower recessed portion of the water feeder pin. In addition, the water feeder pin as shown in FIG. 4 includes recess 22 along with a collar 21 located at an end portion of the water feeder pin wherein the recess 22 has a smaller diameter than the water feeder pin and the collar 21.

As the chicks grow larger, the water supply pipe 1 is raised by a winch or the like to a level higher than their heads. This forces them to drink by pushing the water feeder pin upward. In this case, the amount of water supplied increases with the amount the water feeder pin is pushed up. This ensures that growing fowl get plenty of water and thus promotes the rate of increase in their body weight.

The water feeder according to this invention is able to supply water to fowl in accordance with their need as they grow from chicks to adult birds. Moreover, since it greatly reduces spilling of water onto the poultry house floor, it suppresses the propagation of bacteria and mold, in this way making it possible to promote the rate of increase in fowl's body weight and raise healthy fowl.

Since the invention provides the collar portion at the lower part of the water feeder pin, no drop of water remains hanging from the tip of the pin after a chicken has finished drinking water from the water feeder. Since there is no spontaneous falling of water onto the poultry house floor and since the chickens do not scatter water around the poultry house as they move about, the poultry house remains dry. This suppresses the propagation of bacteria and mold and thus reduces the risk of the chickens contracting diseases.

Further, since the invention ensures that the water feeder pin maintains only point contact during vertical movement, it eliminates two major problems of the prior art water feeders: the problem that the feeder pin is prevented from working as a valve because the viscosity of chemical additives causes it to stick to the water passage and the problem that the surface tension of the feed water attracts the water feeder pin and makes it hard to move. Not only the feeder pin but also the adjustment pin may be tapered at the lower portion thereof to enable precise adjustment of the amount of water fed. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A poultry water feeder which comprises:

a water feeder main body connected with a water supply pipe, a plug attached to the lower end of the main body and defining a water passage, a water feeder pin fitted in the water passage defined by the plug and being vertically movable therein, the water feeder pin being downwardly tapered, and a valve which normally closes the upper end of the water passage and opens the water passage when the water feeder pin is raised wherein a wall of the water passage includes a radially extending annular projection supporting the water feeder pin so as to be vertically movable and tiltable, and the water feeder pin contacts the water passage at a point in the water passage when the water feeder pin is tilted wherein the water feeder pin has a lower recess and wherein a collar having an inwardly projecting flange is connected to an end portion of the water feeder pin and the inwardly projecting flange engages the lower recessed portion of the water feeder pin.

2. A poultry water feeder according to claim 1, wherein a portion of the water feeder pin extending to a position located exterior of the plug includes a member preventing formation of a hanging drop of remaining water.

3. A poultry water feeder according to claim 2, wherein the member preventing formulation of a hanging drop comprises collar.

4. A poultry water feeder according to claim 1, further comprising a water feed amount adjustment pin located above the valve.

5. A poultry water feeder according to claim 4, wherein the feed amount adjustment pin has a tapered lower portion.

6. A poultry water feeder which comprises:

a water feeder main body connected with a water supply pipe, a plug attached to the lower end of the main body and defining a water passage, a water feeder pin fitted in the water passage defined by the plug and being vertically movable therein, the water feeder pin being downwardly tapered, and a valve which normally closes the upper end of the water passage and opens the water passage when the water feeder pin is raised wherein a wall of the water passage includes a radially extending annular projection supporting the water feeder pin so as to be vertically movable and tiltable, and the water feeder pin contacts the water passage at a point and the water passage when the water feeder pin is tilted and wherein the water feeder pin has a recess, having a diameter smaller than that of said pin, positioned adjacent a lower end of said pin.

* * * * *